United States Patent
Gupta et al.

(10) Patent No.: US 6,948,030 B1
(45) Date of Patent: Sep. 20, 2005

(54) FIFO MEMORY SYSTEM AND METHOD

(75) Inventors: Jay Kishora Gupta, Sunnyvale, CA (US); Amitabha Banerjee, San Jose, CA (US); Somnath Paul, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 162 days.

(21) Appl. No.: 10/234,680

(22) Filed: Sep. 4, 2002

(51) Int. Cl.$^7$ ............................................. G06F 13/00
(52) U.S. Cl. ........................... 711/109; 711/5; 711/154; 711/170; 710/53; 710/57; 365/78; 365/189.03; 370/232
(58) Field of Search ........................ 711/109, 110, 149, 711/170, 5, 154, 156; 710/52–57; 365/78, 365/189.03; 370/230, 232, 389

(56) References Cited

U.S. PATENT DOCUMENTS

| | | | | |
|---|---|---|---|---|
| 4,727,536 A | * | 2/1988 | Reeves et al. | 370/468 |
| 4,740,916 A | | 4/1988 | Martin | 364/900 |
| 4,987,539 A | * | 1/1991 | Moore et al. | 356/39 |
| 5,371,877 A | * | 12/1994 | Drako et al. | 711/109 |
| 5,412,611 A | * | 5/1995 | Hattori et al. | 365/221 |
| 5,559,450 A | * | 9/1996 | Ngai et al. | 326/40 |
| 5,572,148 A | * | 11/1996 | Lytle et al. | 326/41 |
| 5,594,702 A | * | 1/1997 | Wakeman et al. | 365/230.05 |
| 5,594,927 A | * | 1/1997 | Lee et al. | 710/66 |
| 5,675,757 A | * | 10/1997 | Davidson et al. | 712/201 |
| 5,787,496 A | | 7/1998 | Kobayashi | 711/220 |
| 5,804,986 A | * | 9/1998 | Jones | 326/40 |
| 5,809,557 A | * | 9/1998 | Shemla et al. | 711/173 |
| 5,844,890 A | * | 12/1998 | Delp et al. | 370/230 |
| 5,897,667 A | * | 4/1999 | Miller et al. | 711/218 |
| 6,014,722 A | * | 1/2000 | Rudin et al. | 710/240 |
| 6,044,416 A | * | 3/2000 | Hasan | 710/52 |
| 6,226,274 B1 | | 5/2001 | Reese et al. | 370/280 |
| 6,240,492 B1 | * | 5/2001 | Foster et al. | 711/149 |
| 6,289,066 B1 | * | 9/2001 | LaVigne et al. | 375/372 |
| 6,340,897 B1 | * | 1/2002 | Lytle et al. | 326/40 |
| 6,414,961 B1 | | 7/2002 | Katayanagi | 370/395.71 |
| 6,526,495 B1 | * | 2/2003 | Sevalia et al. | 711/173 |
| 6,556,495 B2 | * | 4/2003 | Condorelli et al. | 365/221 |
| 6,629,226 B1 | * | 9/2003 | Paul et al. | 711/169 |
| 6,751,153 B2 | * | 6/2004 | Mori et al. | 365/230.06 |

OTHER PUBLICATIONS

Cypress Semiconductor Corporation, CY7C43626 Data Sheet, Tri Bus FIFO, Oct. 6, 1998.*

* cited by examiner

Primary Examiner—Hong Kim
(74) Attorney, Agent, or Firm—Law Office of Dale B. Halling

(57) ABSTRACT

A FIFO memory system for multiple input channels, has a channel control logic coupled to a channel input signal. A pointer and flag logic block is coupled to an output of the channel control logic. A memory has an address bus coupled to the channel control logic and the pointer and flag logic.

16 Claims, 3 Drawing Sheets

FIFO MEMORY SYSTEM AND METHOD

FIELD OF THE INVENTION

The present invention relates generally to the field of memories and more particularly to a FIFO (First In First Out) memory system and method for multiple input channels.

BACKGROUND OF THE INVENTION

High speed (large bandwidth) communication systems often require a memory to buffer the incoming data of multiple channels. Present FIFO (first in first out) memories for this application have a flag logic block for each channel. The flag logic blocks are configured to address a certain depth of memory based on the associated channel's data rate or bandwidth. Each of these logic blocks may potentially need to address the full memory space. As a result each logic block needs to compute and manage pointers and flags on all the address bits of memory. This results in the system having a significant amount of logic gates dedicated to computing and managing pointers and flags.

Thus there exists a need for a FIFO memory system for multiple input channels.

SUMMARY OF INVENTION

A FIFO memory system for multiple input channels, has a channel control logic coupled to a channel number as an input. A pointer and flag logic block is coupled to an output of the channel control logic. A memory has an address bus coupled to the channel control logic and the pointer and flag logic. In one embodiment, the channel control logic controls a plurality of most significant address lines of the address bus. In another embodiment, the pointer and flag logic block controls a plurality of least significant address lines.

In one embodiment, the FIFO memory system has several pointer and flag logic blocks. In one embodiment the number of pointer and flag logic blocks is determined by a slowest bandwidth channel. In another embodiment, the number of pointer and flag logic blocks is determined by the total bandwidth of all input channels.

In one embodiment, the memory is divided into a plurality of memory banks. In one embodiment, the number of memory banks is equal to the number of pointer and flag logic blocks.

In one embodiment, a method of operating a FIFO memory system for multiple input channels includes the steps of configuring a number of memory banks within a memory based on a bandwidth of a slowest input channel. Next, an input data stream is received. Then, it is determined which of the memory banks will store the input data stream based on an input channel. In one embodiment, a number of pointer and flag logic blocks are configured. The number of pointer and flag logic blocks is equal to a total input bandwidth divided by the bandwidth of the slowest input channel.

In another embodiment a first group of address lines are set based on the input channel. In another embodiment, the first group of address lines are set based on a channel map. In one embodiment, a last used memory block within a channel map is determined. A next memory block is selected within the channel map. In one embodiment, a subset of the number of memory banks is assigned to one of the multiple input channels.

In one embodiment, a FIFO memory system for multiple input channels has a bank select logic having a channel input. A number of pointer and flag logic blocks are coupled to the bank select logic. A memory has an address bus coupled to the bank select logic and the pointer and flag logic blocks. In one embodiment, a channel and flag logic is coupled to the pointer and flag logic blocks.

In one embodiment, the bank select logic includes a configuration register. In another embodiment, the bank select logic includes a map logic coupled to the configuration register. In one embodiment, the bank select logic has a multiplexer coupled to the channel input. In another embodiment, the bank select logic includes a flip flop.

This FIFO memory system and method reduces the amount of logic required for the pointer and flag logic blocks by only requiring these logic blocks to control least significant bit of the address bus.

DETAILED DESCRIPTION OF THE DRAWINGS

Figure 1:
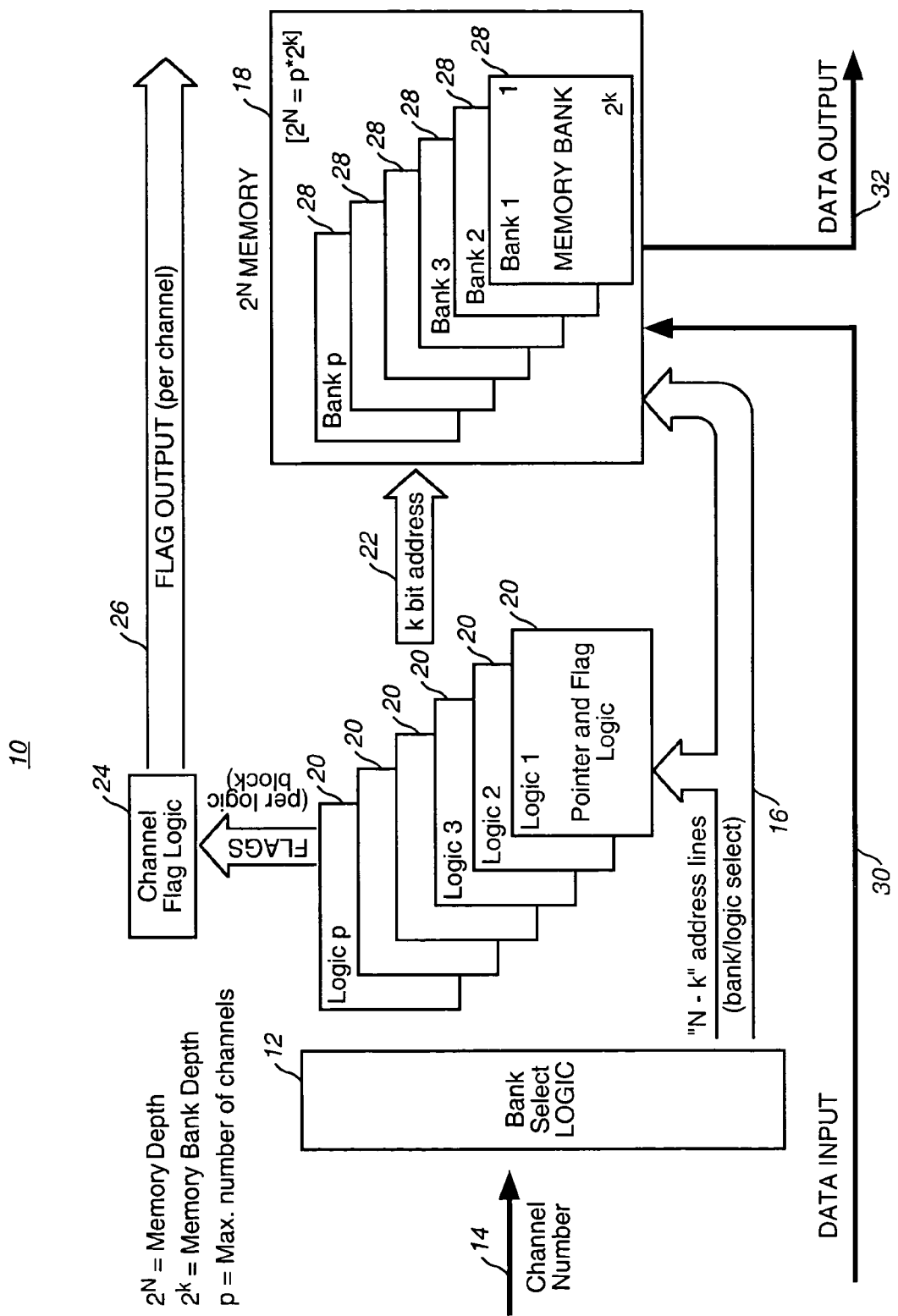
FIG. 1 is a block diagram of a FIFO memory system for multiple input channels in accordance with one embodiment of the invention.

FIG. 1 is a block diagram of a FIFO (First In First Out) memory system 10 for multiple input channels in accordance with one embodiment of the invention. The system 10 has a bank select logic 12, also referred to as the channel control logic, coupled to a channel number input 14. The bank select logic 12 is coupled to a plurality of address lines 16 of a memory 18. The address lines 16 are also coupled to a plurality of pointer and flag logic blocks 20. The pointer and flag logic blocks 20 control a second plurality of address lines 22 of the memory 18. The pointer and flag logic blocks are also coupled to the channel flag logic 24. The output 26 of the channel flag logic 24 are flag outputs on a channel basis. The memory 18 is divided into a plurality of memory banks 28. A data input line 30 and a data output line 32 are coupled to the memory 18.

The number of pointer and flag logic blocks 20 and the number of memory banks 28 is determined by the slowest channel. The total bandwidth (or data rate) W of the input data channels is divided by the the bandwidth of the slowest channel w to determine the number p of pointer and flag logic blocks 20 (p=W/w). If the slowest channel requires a FIFO memory depth of 2 k then the total size of the memory should be $2^N=(p*2^k)$. So if the total bandwidth of the input channels is 40 Gbits and the slowest channel's bandwidth is 2.5 Gbits the total number of pointer and flag logic blocks 20 is sixteen (40/2.5). There is a one to one correspondence between the number of pointer and flag logic blocks 20 and the number of memory banks 28, in one embodiment. So in this case the number of memory banks is sixteen. If all the channels have a data rate of 2.5 Gbits then there would be a one to one correspondence between the input channels and the memory banks 28. However, in most cases different channels will have different data rates. For instance, in the case of OC768c, a fiber optic telecommunication standard, the total bandwidth is 40 Gbits and may be composed of two OC192, 10 Gbit data streams and eight OC48, 2.5 Gbit data streams. In this case a separate memory bank 28 and pointer and flag logic block 20 would be assigned to each of the OC48 channels. The two OC192 channels would each require four memory banks 28 and four associated pointer and flag logic banks 20.

Using the example above assume that channel one is a 10 Gbit channel. Four of the memory banks 28 and four of the pointer and flag logic blocks 20 are mapped to the first channel. In one embodiment, pointer and flag blocks logic-1, logic-5, logic-9 and logic-13 are mapped to channel one. When data is received on channel one the bank select logic 12 sets the most significant address lines 16 (address lines N–k). The bank select logic 12 does this based on the channel input and the channel map. When data is first received on channel one in our example, the first word of data is stored in the first memory bank 28. The second word of data is stored in the fifth memory bank 28, the third word of data is stored in the ninth memory bank 28, the fourth word of data is stored in the thirteenth memory bank 28 and then the process continues with the first memory bank 28. As a result the data is interleaved among the four memory banks 28. Thus the bank select logic 14 determines in which memory bank that the incoming data is stored. The pointer and flag logic blocks 20 are also selected by the bank select logic 12. The pointer and flag logic blocks 20 then sets the least significant (k bit address lines) address lines 22. This determines where in the memory bank 28 the data is stored. As a result, the pointer and flag logic blocks 20 use less logic gates since they only control a portion of the address bus 22 of the memory 18. Note that the pointer and flag logic blocks 20 perform essentially the same function as the flag logic blocks of the prior art. However, the pointer and flag logic blocks 20 do not have a one to one correspondence with the input channels and only have to control the address lines within a single memory bank 28.

In one embodiment, a method of operating a FIFO memory system for multiple input channels includes the steps of configuring a number of memory banks 28 within a memory based on a bandwidth of a slowest input channel. Next, an input data stream is received. Then, it is determined which of the memory banks 28 will store the input data stream based on an input channel number 14. In one embodiment, a number of pointer and flag logic blocks 20 are configured. The number of pointer and flag logic blocks 20 is equal to a total input bandwidth divided by the bandwidth of the slowest input channel.

In another embodiment a first group of address lines 16 are set based on the input channel. In another embodiment, the first group of address lines 16 are set based on a channel map. In one embodiment, a last used memory block within a channel map is determined. A next memory block is selected within the channel map. In one embodiment, a subset of the number of memory banks 28 is assigned to one of the multiple input channels.

Figure 2:
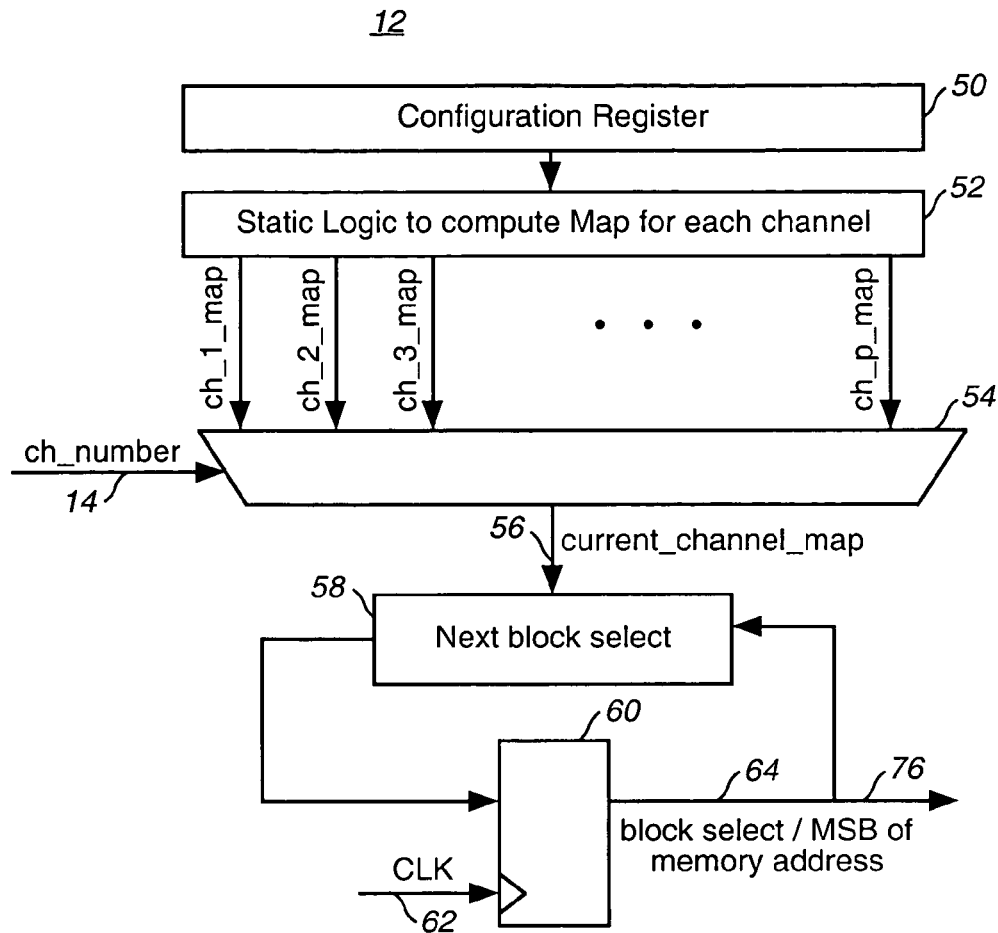
FIG. 2 is a block diagram of a bank select logic in accordance with one embodiment of the invention.

FIG. 2 is a block diagram of a bank select logic 12 in accordance with one embodiment of the invention. The bank select logic 12 has a configuration register 50 coupled to a static logic 52. The configuration register 50 holds the map assignment of the memory banks to each input channel. The static logic 52 converts the map for each channel into an address for each memory bank assigned to the channel. The static logic 52 is coupled to a multiplexer 54. The multiplexer 54 is coupled to the channel number input 14. The output 56 of the multiplexer 54 is to select the current channel map information. This serves as an input to a next block select logic circuit 58. A flip flop 60 is coupled to the next block select logic circuit 58. The flip flop 60 also has a clock input 62. The output 64 of the flip flop 60 is coupled to the next block select logic circuit 58 and coupled to the most significant address lines 16 of the memory 18. Note that while the figure only shows a single next block select logic circuit 58 and a single flip flop 60, each channel would have a next block select logic circuit 58 and a flip flop 60. So if there were ten input channel there would be ten next block select logic circuits 58 and ten flip flops 60.

Figure 3:
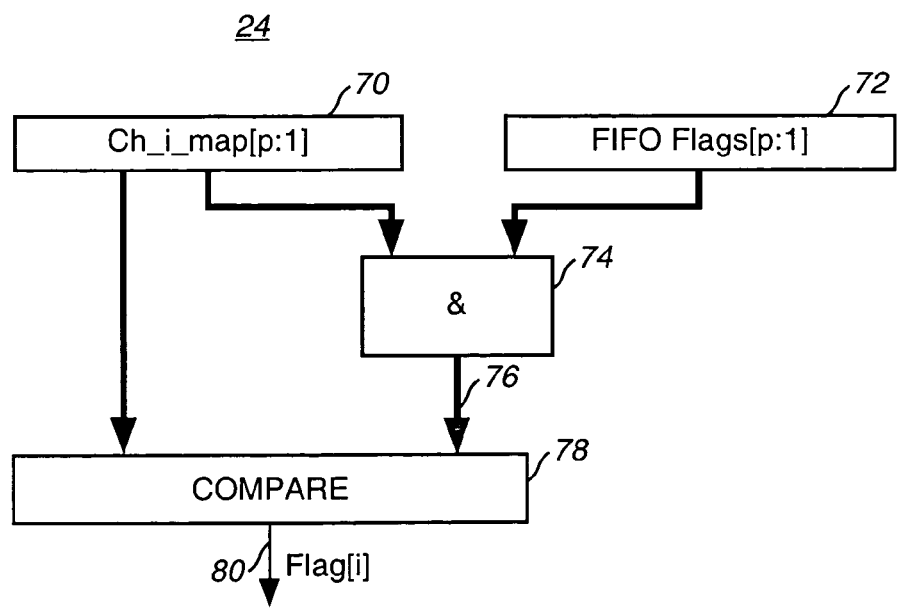
FIG. 3 is a block diagram of a channel flag logic in accordance with one embodiment of the invention.

FIG. 3 is a block diagram of a channel flag logic 24 in accordance with one embodiment of the invention. The channel flag logic 24 is necessary since the flags generated by the pointer and flag logic blocks 20 do not necessarily correspond to a particular channel. The channel flag logic 24 has a channel register 70 that is set to the map for the channel of interest. The channel flag logic 24 also has a flag register 72 that holds flags generated by the pointer and flag logic flags 20. The channel register 70 and the flag register 72 are coupled to a bank of AND gates 74. The output 76 of the AND bank 74 is coupled to a compare logic block 78 or comparator. The output 80 of the compare logic block 78 is a flag for a particular channel. The purpose of the AND bank 74 is to select only the flags associated with the channel of interest. The output 76 is compared with pattern of flags expected for a channel. For instance, if channel one is mapped to four memory banks 28, then the pointer and flag logic blocks 20 associated with these four memory banks 28 will produce flags. One of these flags might be a half full flag. In order to determine whether the half full flag should be set for channel one we need to determine if the half full flags are set for all four memory banks 28 associated with channel one. If only two of the memory banks 28 are half full, then the half full flag for channel one is not set.

Figure 4:
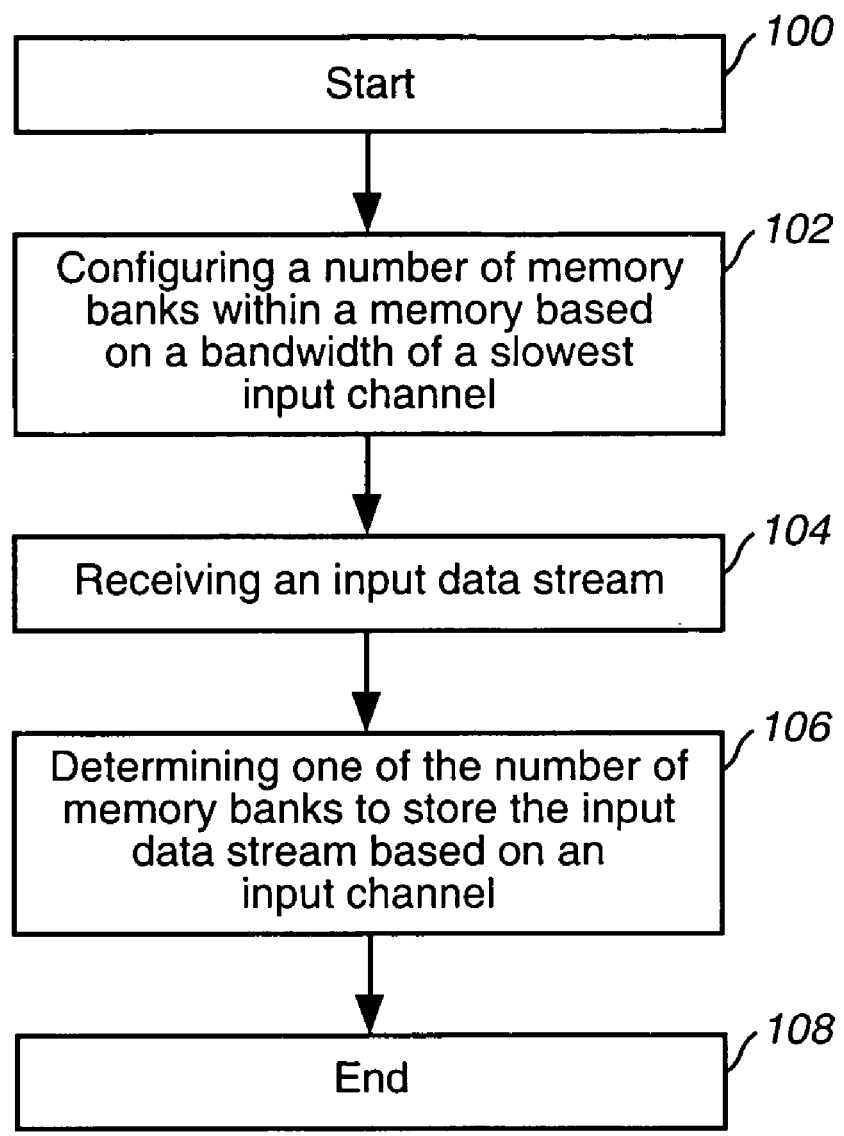
FIG. 4 is a flow chart of a method of operating a FIFO memory system for multiple input channels in accordance with one embodiment of the invention.

FIG. 4 is a flow chart of a method of operating a FIFO memory system for multiple input channels in accordance with one embodiment of the invention. The process starts, step 100, by configuring a number of memory banks within a memory based on a bandwidth of a slowest input channel at step 102. An input data stream is received at step 104. At step 106 it is determined which one of the number of memory banks will store the input data based on an input channel, which ends the process at step 108.

Thus, there has been described a FIFO memory system and method that reduces the number of logic gates required to operate the memory system. The advantage, of the present system and method, increases significantly as the number of input channels increases. In one embodiment, the system relies on assumption that the data rate of the higher bandwidth channels is a multiple of the data rate of the slowest bandwidth channel. The system divides the responsibility for controlling the address space of the memory. One portion of the address lines 16 are controlled by the bank select logic 12. The bank select logic 12 selects which memory bank 28 will store the incoming data. Where the data is stored within the memory bank 28 is determined by the pointer and flag logic block 20 associated with the memory bank 28. Thus the control logic blocks 20 only have to control the least significant address bit lines 22 of the memory 18. Note that while the specification has stated that the pointer and flag logic blocks 20 control the least significant address lines and the bank select logic 12 control the most significant address lines, if would be possible for the bank select logic 12 to control the least significant address lines and the pointer and flag logic 20 to control the most significant address lines.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A FIFO memory system for multiple input channels, comprising:
   a channel control logic coupled to a channel input signal;
   a plurality of pointer and flag logic blocks coupled to an output of the channel control logic, wherein the number of pointer and flag logic blocks is determined by a slowest bandwidth channel and by the total bandwidth of all input channels; and
   a memory having an address bus coupled to the channel control logic and the pointer and flag logic.

2. The system of claim 1, wherein the channel control logic controls a plurality of most significant address lines of the address bus.

3. The system of claim 1, wherein the pointer and flag logic block controls a plurality of least significant address lines.

4. The system of claim 1, wherein the memory is divided into a plurality of memory banks.

5. The system of claim 4, wherein the number of memory banks is equal to the number of pointer and flag logic blocks.

6. A method of operating a FIFO memory system for multiple input channels, comprising the steps of:
   a) configuring a number of memory banks within a memory based on a bandwidth of a slowest input channel;
   b) receiving an input data stream; and
   c) determining one of the number of memory banks to store the input data stream based on an input channel.

7. The method of claim 6, wherein step (a) further includes the step of:
   a1) configuring a number of pointer and flag logic blocks, wherein the number is equal to a total input bandwidth divided by the bandwidth of the slowest input channel.

8. The method of claim wherein step (c) further includes the step of:
   c1) setting a first plurality of address lines based on the input channel and on a channel map.

9. The method of claim 8, wherein step (c1) further including the steps of:
   i) determining a last used memory block within a channel map;
   ii) selecting a next memory block within the channel map.

10. The method of claim 6, wherein step (c) further includes the step of:
    c1) assigning a subset of the number of memory banks to one of the multiple input channels.

11. A FIFO memory system for multiple input channels, comprising:
    a bank select logic having a channel number as an input, wherein the bank select logic includes a configuration register and a map logic coupled to the configuration register;
    a plurality of pointer and flag logic blocks coupled to the bank select logic; and
    a memory having an address bus coupled to the bank select logic and the plurality of pointer and flag logic blocks.

12. The system of claim 11, wherein the bank select logic has a multiplexer coupled to the channel input and a flip flop coupled to the multiplexer.

13. The system of claim further including a channel and flag logic coupled to the plurality of pointer and flag logic blocks.

14. The system of claim 13, wherein the channel and flag logic has a channel number input and a channel map input.

15. The system of claim 14, further including an AND gate coupled to the channel map.

16. The system of claim 15, wherein the AND gate is coupled to a comparator.

* * * * *